July 25, 1950

H. V. LEA 2,516,470

BEET HARVESTER

Filed Aug. 8, 1945

INVENTOR
H. V. Lea

ATTORNEYS

July 25, 1950  H. V. LEA  2,516,470
BEET HARVESTER
Filed Aug. 8, 1945  4 Sheets-Sheet 2

INVENTOR
H. V. Lea
BY
ATTORNEYS

July 25, 1950

H. V. LEA 2,516,470

BEET HARVESTER

Filed Aug. 8, 1945

INVENTOR.
H. V. Lea

ATTYS

July 25, 1950

H. V. LEA 2,516,470

BEET HARVESTER

Filed Aug. 8, 1945

INVENTOR.
H. V. Lea
BY
Webster & Webster
ATTYS

Patented July 25, 1950

2,516,470

UNITED STATES PATENT OFFICE 2,516,470

BEET HARVESTER

Henry V. Lea, Rio Vista, Calif., assignor of twenty-one and one-fourth per cent to Claude A. Loucks, thirty-six and one-fourth per cent to Lloyd K. Schmidt, twenty-one and one-fourth per cent to Albert M. Jongeneel, and twenty-one and one-fourth per cent to George P. du Bose Application August 8, 1945, Serial No. 609,502

7 Claims. (Cl. 55—108)

This invention relates in general to a sugar beet harvester, and particularly to a harvester for such purpose which includes a spiked, beet pick-up wheel operative to ride along a beet row and to impale and elevate beets from the row to a point above ground for topping and subsequent handling.

One feature of the implement herein disclosed is the provision of a novel frame assembly on which the spiked, beet pick-up wheel is mounted; such frame assembly being constructed and mounted so that the pick-up wheel may float vertically as it traverses a beet row whereby to automatically compensate for ground level variations and projection of beet crowns, while effectively maintained against lateral instability.

Another feature of the implement is the inclusion with the frame assembly, as above, of transversely spaced ground engaging wheels disposed on opposite sides of and laterally out from the pick-up wheel; the latter being normally vertically floatable relative to said ground engaging wheels, and the latter simultaneously preventing any lateral tilting of said pick-up wheel. However, the ground engaging wheels are arranged for manually controlled power actuation to cause such relative vertical adjustment of the pick-up wheel as working conditions may require, or for transport of the implement from place to place.

A further object of the invention is to produce a beet harvester which is exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
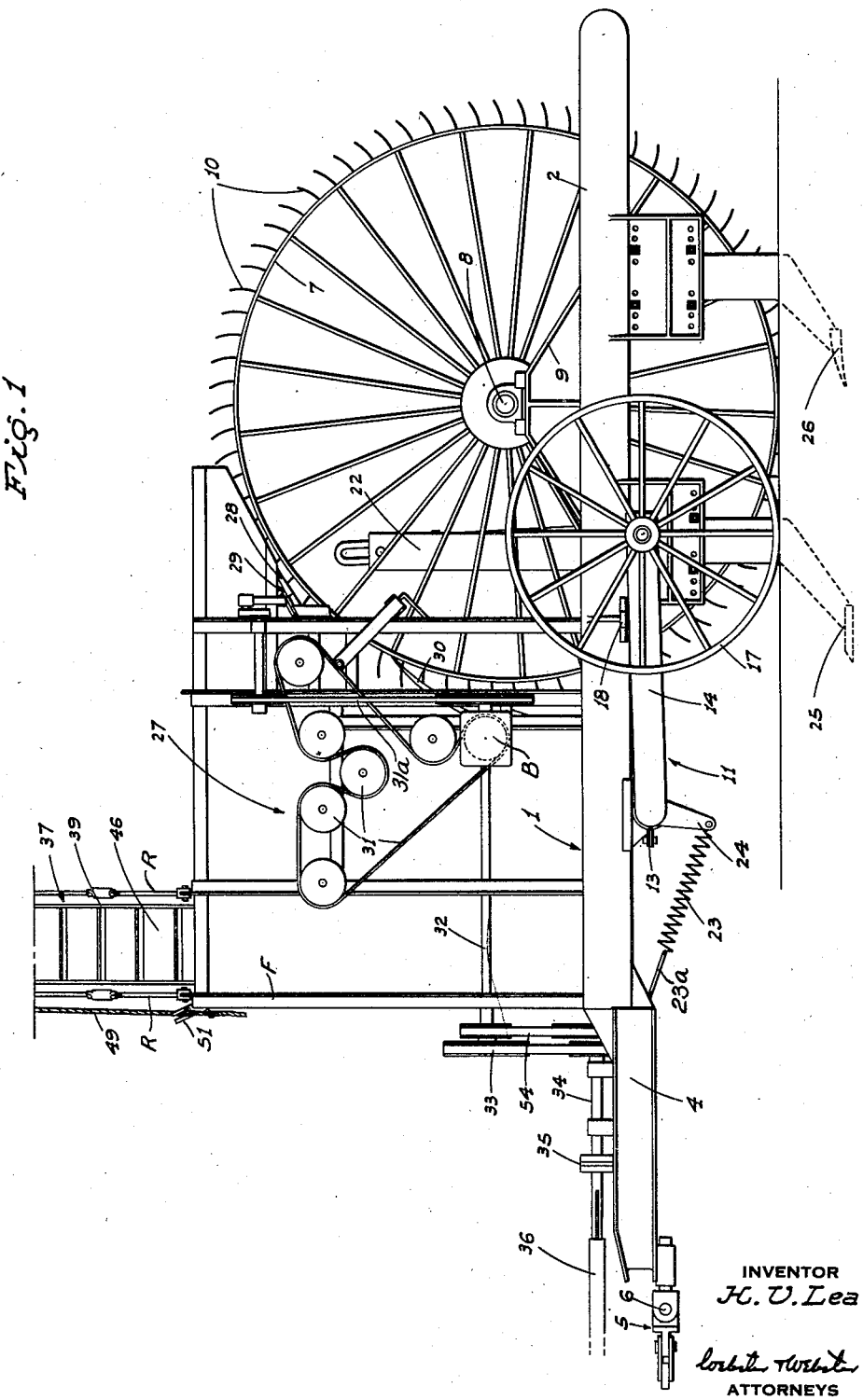
Figure 1 is a side elevation of the beet harvester.

Referring now more particularly to the characters of reference on the drawings, the implement comprises a rigid, elongated frame, indicated generally at 1, including transversely spaced parallel side beams 2 connected together at their rear ends by a cross beam 3, and at their forward ends by a rigid, forwardly projecting draft structure 4. At the front the draft structure 4 is provided with a hitch, indicated generally at 5, and which hitch includes a transverse pivot 6 about which the elongated frame 1 is vertically swingable whereby said frame may float in the manner and for the purpose hereinafter described.

A relatively large diameter, spiked, beet pick-up wheel 7 is disposed symmetrically between the side beams 2 of the frame 1; said wheel 7 including a transverse axle 8 extending in overhanging relation to and journaled in connection with the side beams 2 by journal brackets 9. The diameter of the pick-up wheel 7 is such that it projects a substantial distance below the frame 1; said wheel having a relatively wide face from which a plurality of transversely spaced, circumferentially extending rows of beet impaling and pick-up spikes 10 project.

The frame 1 is vertically adjustable, and normally floatably supported above the ground, by a double crank axle, indicated generally at 11, and which crank axle includes a cross shaft 12 extending between the side beams 2 ahead of the pick-up wheel 7; said cross shaft being journaled in connection with said side beams, as at 13, and extending at opposite ends laterally outwardly beyond the frame 1. At its outer ends the cross shaft 12 is formed with parallel, rearwardly extending crank arms 14 which include, at their rear ends, outwardly projecting spindles, indicated at 15 and 16, respectively. The spindles 15 and 16 are fitted with ground engaging wheels 17, and the spindle 16 is axially adjustable whereby the tread of the implement may be varied. Stops 18 project from the side beams 2 in overhanging relation to the crank arms 14 whereby to limit upward swinging movement thereof beyond a predetermined position.

A fluid pressure actuated power cylinder 19 is fixed in connection with the rear or trailing end portion of one of the crank arms 14, and extends upwardly therefrom; said cylinder 19 including an upwardly projecting piston rod 20 coupled at the top by means of a vertical lost-motion connection 21 with the upper end of a rigid post 22 fixed on and upstanding from the adjacent side beam 2. The fluid pressure actuated power cylinder 19 is controlled from the tractor by a fluid pressure conduit system (not shown) but which includes a manual control valve within reach of the tractor operator.

The double crank axle 11 is normally urged in a rotative direction to maintain the wheels 17 in ground contact by means of a pair of adjustable heavy-duty tension springs 23 disposed in transversely spaced relation and connected between the forward end of the frame 1 and radial levers 24 fixed on and depending from the cross shaft 12. For adjustment purposes, each spring is attached at one end to a longitudinal screw rod 23a on which a nut 23b is threaded, said nut bearing against a cross member 4a of structure 4 and through which member the rod projects. Not only do the springs 23 tend to urge the wheels 17 into ground engagement, but they also serve, in effect, as counterbalancing means for the vertically floatable frame 1.

At points ahead of and trailing the point of ground contact of the spiked, beet pick-up wheel 7 the frame 1 is provided with vertically adjustable leading and trailing plows, indicated at 25 and 26, respectively; the leading plows being disposed to advance lengthwise of the row below the beets therein to loosen the soil thereunder prior to engagement of the spiked wheel with the beets, and the trailing plows being disposed to exert a lifting action on the beets closely adjacent but slightly to the rear of said point of wheel contact whereby to assure positive impaling of the beets on said spiked pick-up wheel. A plow assembly of this type is shown in U. S. Patent No. 2,377,347, dated June 5, 1945.

The implement includes, in cooperation with the spiked, beet pick-up wheel, at the forward portion of the latter and above the frame 1, a plurality of working mechanisms mounted in connection with and supported by a frame and housing assembly, indicated generally at 27, and which assembly upstands from said frame 1. The mechanisms which are supported by the assembly 27 include generally a beet topping unit 28; a leaf cutting unit 29; a beet top stripping unit 30; and a tumbling conveyor (not shown) which functions to tumble and convey the topped beets whereby to separate the latter from adhering soil and foreign material. A similar arrangement of mechanisms is illustrated in U. S. Patent No. 2,350,173 dated May 30, 1944, except for the leaf cutting unit, which is illustrated in U. S. Patent No. 2,380,701 dated July 31, 1945. Such mechanisms of themselves, therefore, form no part of the present invention.

In the present embodiment the moving parts of the tumbling conveyor (not shown) and the leaf cutting unit are driven through the medium of pulley and endless belt systems, indicated at 31 and 31a; said pulley and belt systems being adapted to be driven from the power take-off shaft of the tractor in the following manner:

A countershaft 32 is journaled in connection with the frame and housing assembly 21 to one side of the latter, and extends horizontally lengthwise of the implement. At its rear end the countershaft 32 is directly connected to the pulley and belt system 31a and also drives the pulley and belt system 31 through the medium of an interposed gear box B, while at its forward end said countershaft is driven by a pulley and belt unit 33 from a drive shaft 34 journaled on and extending horizontally and longitudinally forwardly of the rigid draft structure 4. The shaft 34 projects forwardly and is coupled to the rearwardly projecting power take-off shaft of the tractor; said shaft 34 including a flexible coupling 35 and a spline coupling 36 therein, whereby the drive from the tractor is imparted to the implement without restricting vertical floating or swinging of the frame 1.

Figures 2, 3:
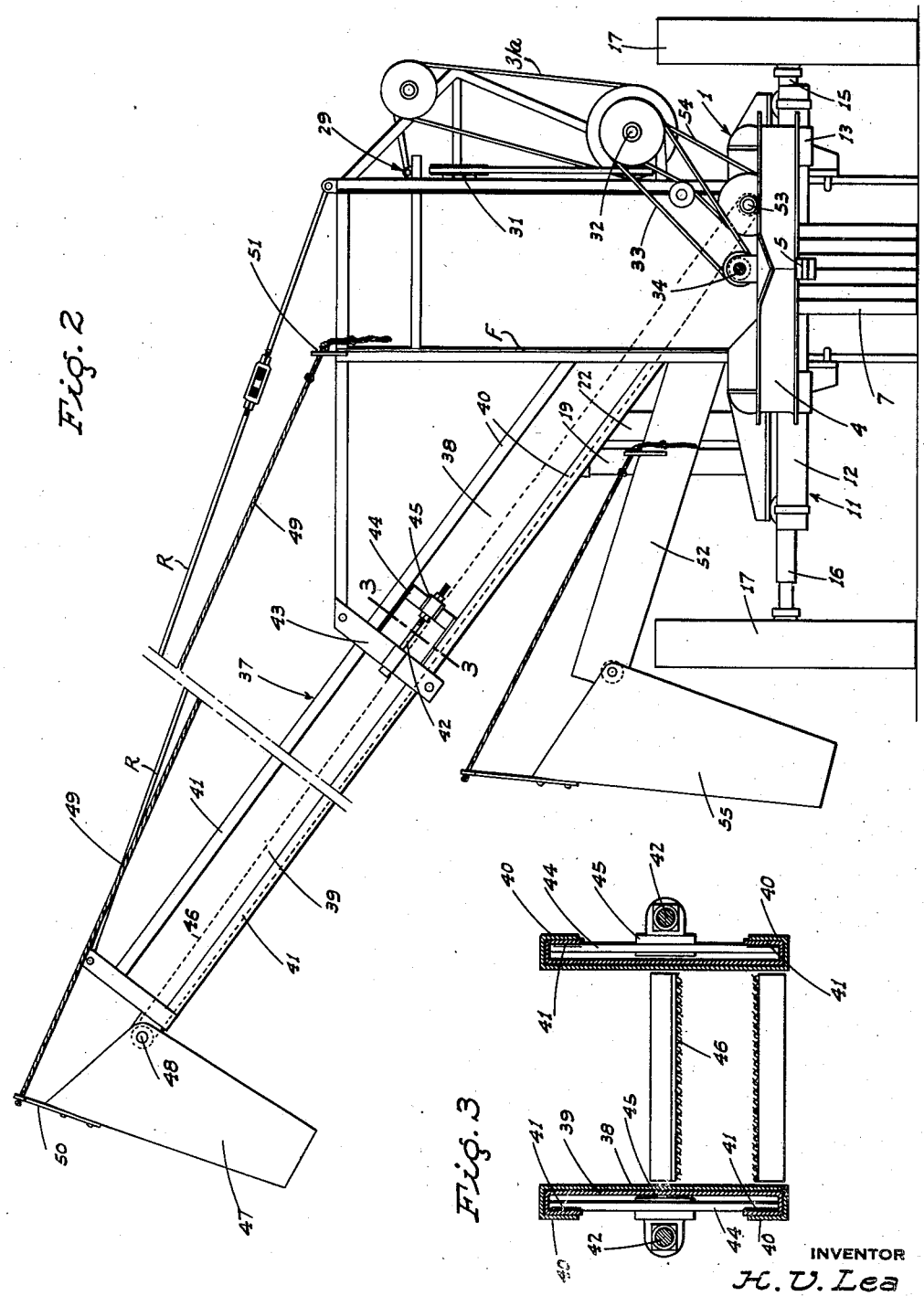
Figure 2 is a front end view of the harvester.
Figure 3 is an enlarged cross section on line 3—3 of Fig. 2.

The beets as impaled on the spikes 10 of the wheel 7 travel counter-clockwise with the latter and are first topped by the unit 28, thence trimmed of any remaining leaves by the leaf cutting unit 29 as the beets fall thereover, and then pass onto the tumbling conveyor (not shown) but which is disposed in the top portion of the housing 27. From the tumbling conveyor the beets are fed onto the lower end of a laterally and upwardly inclined telescopic elevator conveyor unit, indicated generally at 37, and which unit comprises the following structure:

The conveyor unit 37 includes a lower section 38 and an upper section 39, with the upper section 39 arranged to slide telescopically relative to said lower section 38. The lower section 38 includes, along its edges, outwardly projecting channels 40 which face each other on corresponding sides of the section, and the upper section 39 includes matching portions 41 slidably engaged in said channels. When the upper section 39 is extended, as shown in Fig. 2, it is maintained in said position by means of draw bolts 42, on opposite sides thereof, which connect between a rigid frame 43 on the outer end of the lower section and side bars 44 on opposite sides of the upper section 39 at its lower end, by means of tension hooks 45. Guy rods R are then connected between the upper end of section 39 and the top of an upstanding auxiliary frame F on the main frame 1.

The elevator conveyor unit 37 includes a flexible endless belt 46 therein, and which belt merely folds or collapses when the unit 37 is telescoped for transport of the implement.

At its outer end the elevator conveyor unit 37 is fitted with a swinging type spout 47 pivoted, as at 48, for swinging movement transversely of the direction of travel, and whereby to control delivery of beets from said unit 37 into a truck traveling alongside the implement. The angle of adjustment of the spout 47 is controlled by a holding cord 49 which extends from an arm 50 laterally inwardly to adjustable connection, as at 51, with the upper portion of the housing 27.

Another, but relatively shorter, elevator conveyor unit 52 extends at a lateral and upward incline from the housing 27; said conveyor unit 52, together with endless belt 46 of conveyor unit 37, are both driven from the inner end by another countershaft 53 mounted on the frame 1 and coupled in driven relation to the countershaft 32 by a pulley and belt unit 54.

The beet tops after being stripped from the wheel 7 fall onto the lower end of the conveyor unit 52 and are thence elevated laterally of the implement to discharge in a windrow alongside the path of movement of the latter. The beet topping conveyor unit 52 includes a spout 55 mounted and controlled in the same manner as the spout 47.

When the harvester is in operation the power cylinder 19 is set so as to permit the spiked, beet pick-up wheel 7 to run in firm ground contact along the beet row; the wheels 17 riding the ground laterally out from the wheel 7 whereby to stabilize the same.

Also by adjustment of the springs 23 the pressure of the pick-up wheel 7 on a row of beets can be accurately regulated.

After the wheels 17 are set to position, and with advance of the implement, the pick-up wheel 7, together with the frame 1, may—by reason of the vertical lost-motion connection 21—float or swing up and down with variations in the ground contour of the wheel engaged row.

Figure 4:
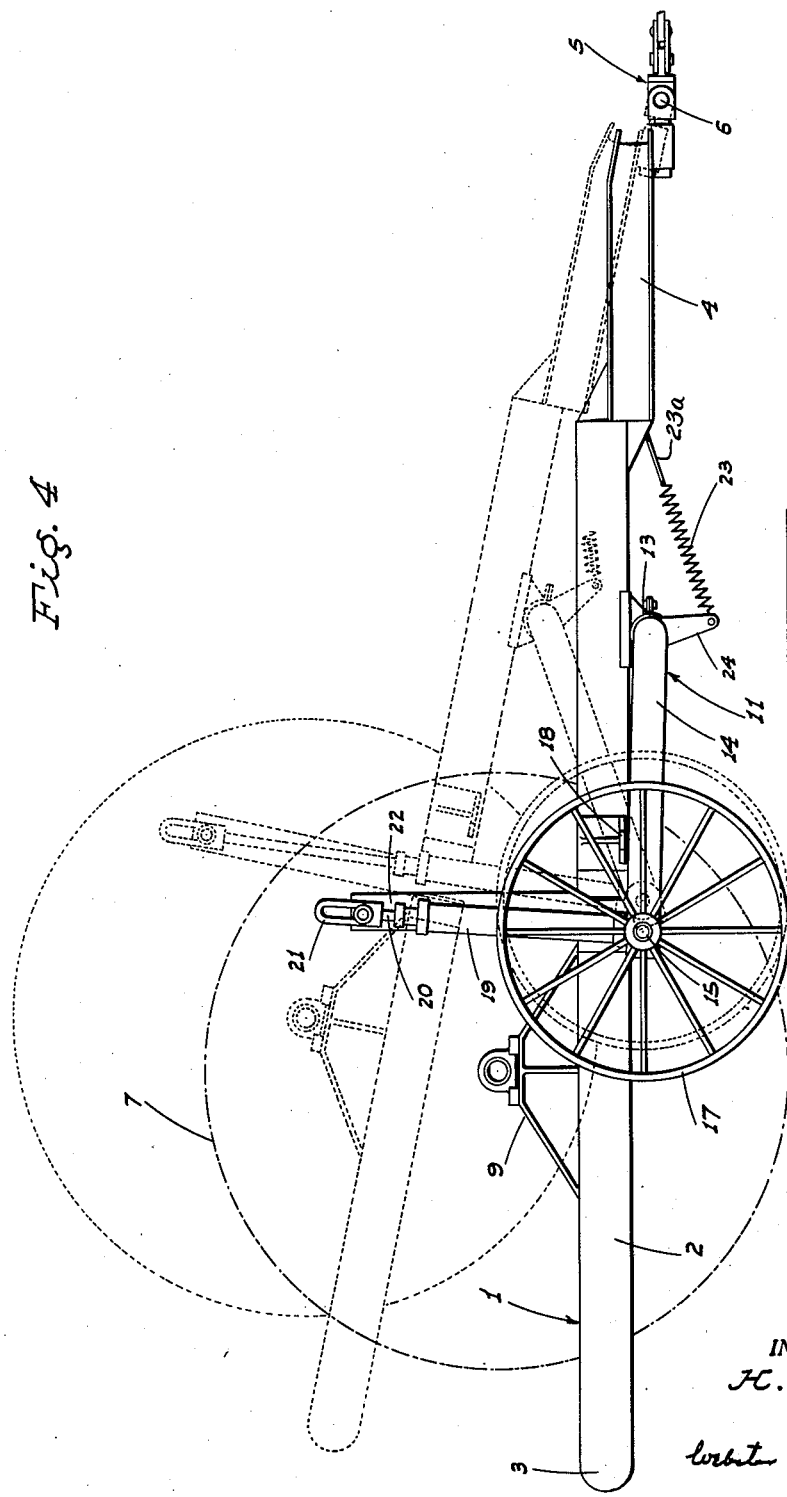
Figure 4 is a side elevation of the wheel supported frame assembly; detached from the remainder of the implement.
Figure 5:
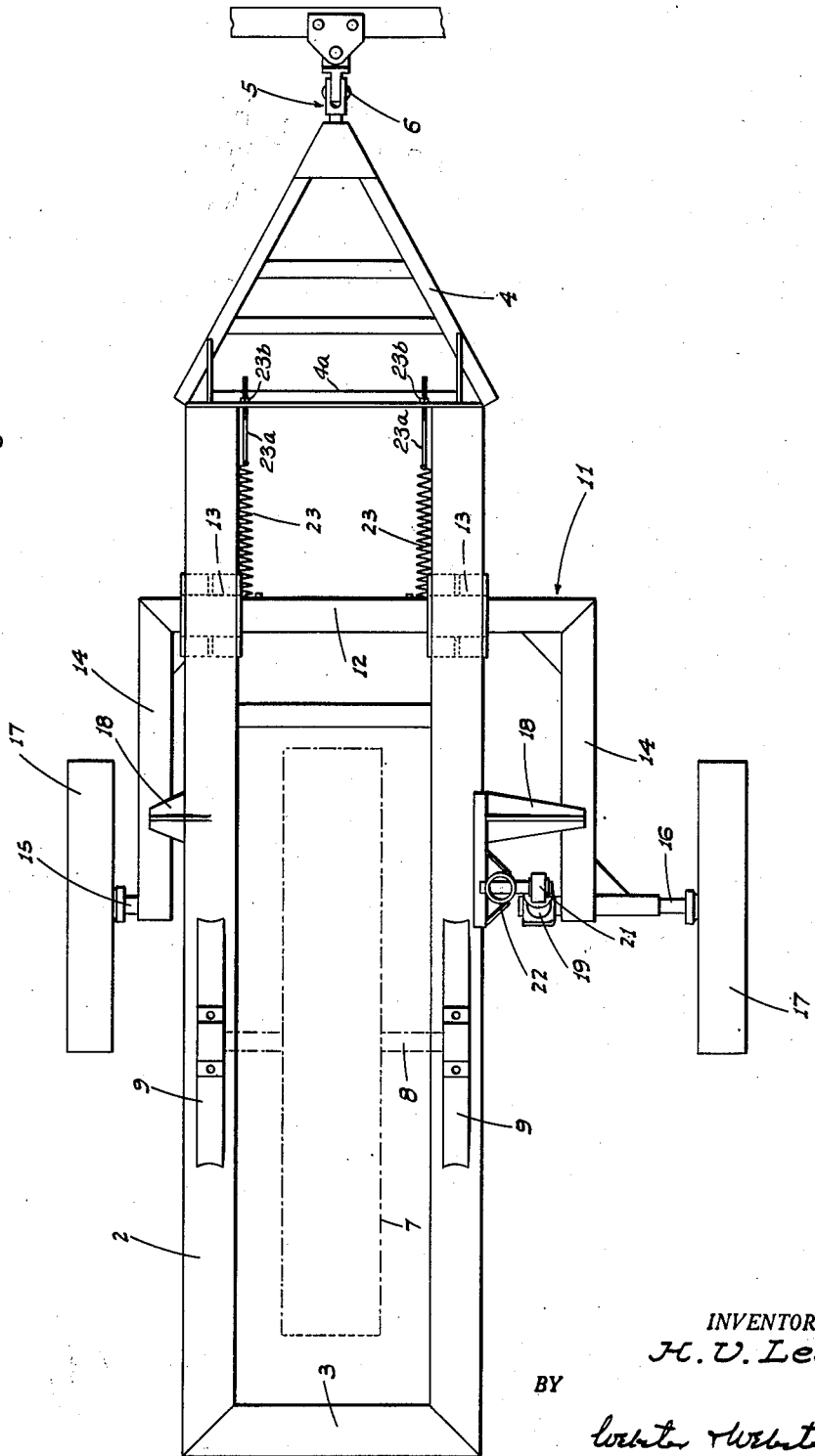
Figure 5 is a plan view of the wheel supported frame assembly, detached from the remainder of the implement.

For transport of the harvester from place to place, or for making turns at the end of a row, and with the pick-up wheel 7 clear of the ground, the power cylinder 19 is actuated to cause substantially full projection of the piston rod 20. This causes lifting of the frame 1 from the full line position to the dotted line position of Fig. 4.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, what is claimed as new and useful and upon which Letters Patent is desired is:

1. A sugar beet harvester including a longitudinally extending frame having a relatively large-diameter spiked, beet pick-up wheel journaled thereon for rotation about a transverse axis, a crank axle journaled transversely on the frame, said axle including rearwardly extending crank arms disposed on opposite sides of the frame, ground engaging wheels mounted on the crank arms, and an upstanding power cylinder connecting one of said crank arms and the frame for relative vertical adjustment of the latter; said cylinder having a vertical lost-motion connection between one end thereof and the adjacent part of the harvester whereby the frame may float vertically to a predetermined extent regardless of its position of relative vertical adjustment.

2. A sugar beet harvester including a longitudinally extending frame having a relatively large-diameter spiked, beet pick-up wheel journaled thereon for rotation about a transverse axis, a crank axle journaled transversely on the frame, said axle including rearwardly extending crank arms disposed on opposite sides of the frame, ground engaging wheels mounted on the crank arms, and means relatively vertically adjustably connecting the crank axle and said frame without limiting predetermined floating movement of the latter, and spring means normally urging said crank arms downwardly; said spring means including a radial lever fixed on the crank axle between the crank arms, and a tension spring connected between said lever and the frame.

3. A beet harvester comprising a longitudinally extending frame, a hitch element at the forward end of said frame for connecting the frame to a draft means, such hitch including a transverse horizontal pivot about which the forward end of said frame is vertically swingable, a spiked beet pick up wheel journaled on said frame intermediate the ends of the frame, transversely spaced ground engaging wheels, the frame lying between said wheels, and means supporting the weight of the frame and pick up wheel on the ground wheels at a point intermediate the ends of the frame, such latter means including connections between the frame and wheels whereby the frame may be swung about said pivot to adjust the vertical position of the frame and pick up wheel relative to said ground engaging wheels.

4. A harvester as in claim 3, including a lost motion means between the frame and ground engaging wheels permitting the frame to float on its pivot to a predetermined extent independently of its vertical adjustment relative to the ground engaging wheels.

5. A harvester as in claim 3 in which said connections include crank arms on which the ground engaging wheels are journaled, said crank arms being pivoted to the frame at a point back of the hitch pivot, and vertically adjustable means between at least one crank arm and the frame at a point adjacent the ground engaging wheel journaled on such arm.

6. A harvester as in claim 5 in which said adjustable means comprises an upstanding post on the frame, a fluid pressure operated jack mounted on the crank arm, the outer end of the piston rod of the jack being pivotally connected with the upper end of the post.

7. A harvester as in claim 6 including stops on the frame engageable with the crank arms to limit relative movement therebetween in one direction.

HENRY V. LEA.

REFERENCES CITED

The following references are of record in the file of this patent:

UNITED STATES PATENTS

| Number | Name | Date |
| --- | --- | --- |
| 773,279 | Dewey | Oct. 25, 1904 |
| 833,456 | Goodfellow | Oct. 16, 1906 |
| 1,353,201 | Williams | Sept. 21, 1920 |
| 1,367,853 | Beckwith | Feb. 8, 1921 |
| 1,503,625 | Beale | Aug. 5, 1924 |
| 1,533,672 | Stockstill | Apr. 24, 1925 |
| 2,166,447 | Ruppenthal | July 18, 1939 |
| 2,350,173 | Loucks | May 30, 1944 |
| 2,371,422 | Bowman | Mar. 13, 1945 |
| 2,404,629 | Griff | July 23, 1946 |
| 2,469,622 | Acton | May 10, 1949 |